UNITED STATES PATENT OFFICE.

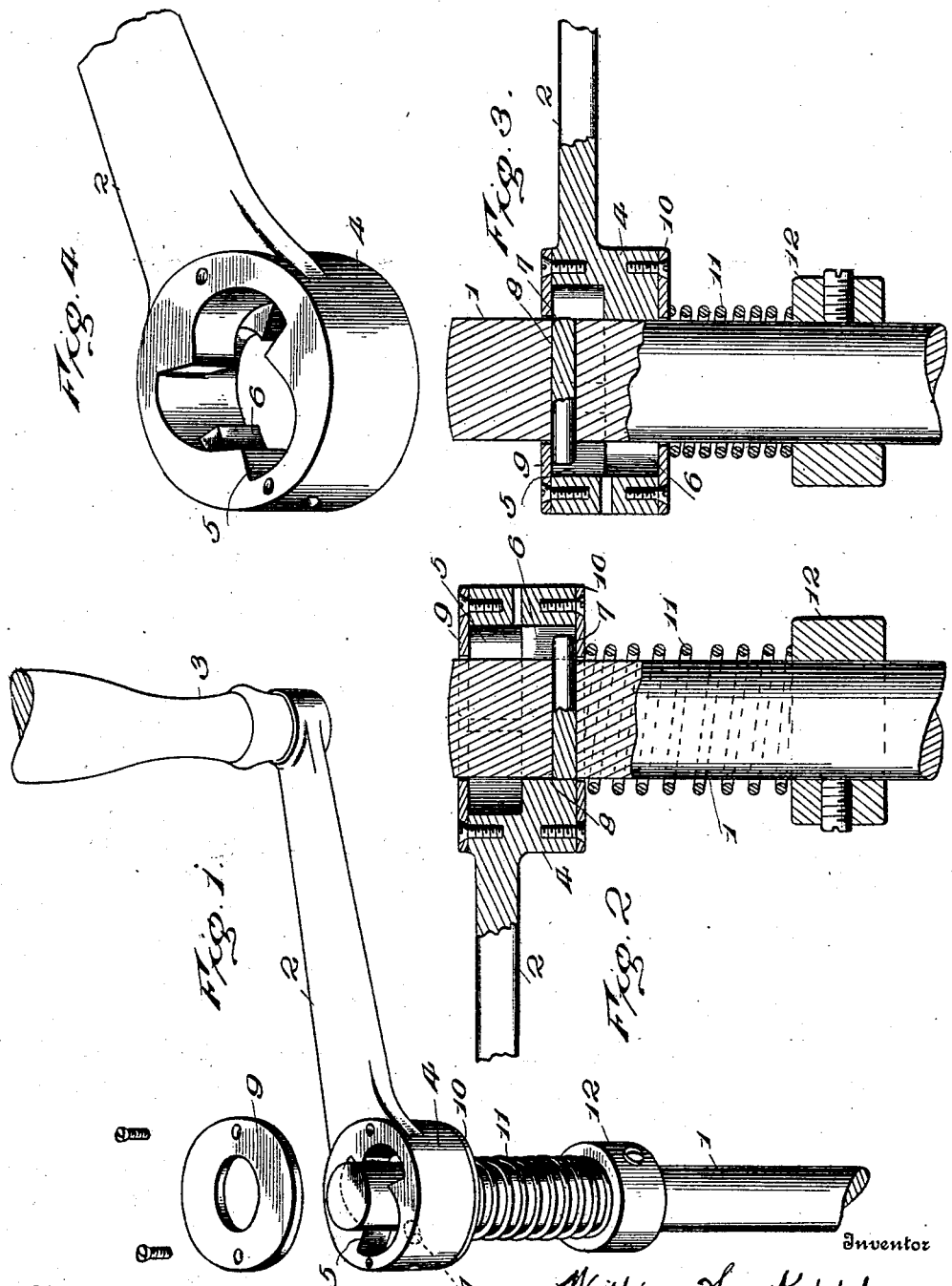

WILLIAM H. KEPPLE, OF HARRISBURG, PENNSYLVANIA, ASSIGNOR TO W. O. HICKOK MANUFACTURING COMPANY, OF HARRISBURG, PENNSYLVANIA, A CORPORATION OF PENNSYLVANIA.

HANDLE.

No. 904,619.   Specification of Letters Patent.   Patented Nov. 24, 1908.

Application filed January 30, 1908. Serial No. 413,448.

*To all whom it may concern:*

Be it known that I, WILLIAM H. KEPPLE, a citizen of the United States, and residing at Harrisburg, in the county of Dauphin and State of Pennsylvania, have invented certain new and useful Improvements in Handles, of which the following is a specification.

This invention relates to handles for use in connection with various machines and particularly ruling and other machines used in the book-binding art, although its use is not confined to that art alone.

In its preferred embodiment my invention comprises a handle mounted on a shaft or the like which is normally adapted to rotate said shaft in one direction only, but is adapted by adjustment to rotate the shaft in the reverse direction.

The device is illustrated in the accompanying drawings in which—

Figure 1 is a perspective view with the "upper plate" removed. Fig. 2 is a vertical central section. Fig. 3 is a view similar to that shown in Fig. 2 with the handle pushed downwardly. Fig. 4 is a perspective detail view of the socket member detached.

Referring now to the drawings, the reference numeral 1 indicates the shaft, spindle or other member to be rotated upon which the handle 2 is mounted. This handle preferably comprises the usual crank 3 and the socket 4 adapted to fit over the end of the shaft. The interior surface of the socket adjacent the shaft is recessed to form two circular series 5 and 6 of oppositely facing ratchet teeth adapted to engage with a sliding pin or pawl 7 operating in a slot 8 formed in the shaft 1. Upper and lower plates 9 and 10 fit over the shaft 1 and cover the upper and lower surfaces of the socket 4. These plates may be secured to the socket by screws as illustrated or by any other suitable means. Bearing against the lower plate 10 is one end of a spring 11 which is coiled around the shaft 1 and has its other end bearing against a collar 12 which is adjustably secured upon the shaft 1 to vary the tension of the spring. The tension of this spring normally forces the member 4 and its connected parts toward the upper end of the shaft, until the plate 10 comes in contact with the pawl 7, thereby limiting the throw of the spring and placing the lower series of ratchet teeth in position to engage with the pawl 7 and thus permit the shaft or like rotatable member to be rotated in a forward direction. The throw of the spring may be varied, however, by adjusting the collar 12 on the shaft 1.

If it is desired to rotate the shaft in the opposite direction, the handle and its socket should be pushed down against the tension of the spring until the upper series of ratchet teeth are in position to engage with the pawl when the shaft may be rotated in the reverse direction. The movement of the socket against the tension of the spring is limited by the plate 9 coming in contact with the pawl 7 thus preventing any further displacement of the socket relative to the shaft. Upon the pressure being released, the spring will force the socket back to its normal position, its movement in that direction being limited, as before stated, by the plate 10 coming in contact with the pawl 7. These plates thus act as stops to limit the movements of the socket relative to the shaft and also as a means of indicating that the socket is in position for rotating the shaft. While they stop the handle in an operative position, the plates 9 and 10 mark the limit of the throw necessary to place the ratchet surfaces in operative position relative to the pawl and it is not absolutely necessary that the plates should come in contact with the pawl as the shaft may be rotated whenever the pawl is positioned on either side of the central line between the two series of ratchet teeth.

Owing to the opposite inclination of the ratchet teeth, it is obvious that the shaft itself cannot be rotated in both directions when the handle is in any one position but that the handle may be freely rotated in the reverse direction to that in which the shaft can rotate without rotating the shaft. If it is desired to rotate the shaft in the reverse direction, the handle and its socket should be pushed down against the tension of the spring when the oppositely facing series of ratchet-teeth will be in position to engage with the pawl and the shaft can therefore be rotated in the reverse direction, the handle and its socket now being revoluble on the shaft in the opposite direction to that in which they rotate the shaft itself.

While I have described my handle as being in the form of a crank, this form is not essential to the operation of my device and any suitable means for rotating a shaft or spindle may be employed.

What I claim and desire to secure by Letters Patent is:—

1. In a device of the character described, a shaft or spindle, a member mounted thereon provided with a socket, a laterally moving pawl carried by said shaft and adapted to engage with said socket, means normally holding said socket in engagement with said pawl to render said shaft rotatable in one direction, and means whereby the displacement of said member relative to said pawl renders the shaft rotatable in a reverse direction.

2. In a device of the character described, a shaft or spindle, a member mounted thereon provided with a socket, a pawl carried by said shaft and adapted to engage with said socket, a spring normally holding said socket in engagement with said pawl to render said shaft rotatable in one direction and means whereby the sliding of said member on said shaft in opposition to said spring renders the shaft rotatable in a reverse direction.

3. In a device of the character described, a shaft or spindle, a member mounted thereon provided with a socket and two sets of surfaces formed therein, a pawl carried by said shaft, a spring normally holding one set of said surfaces in engagement with said pawl to render said shaft rotatable in one direction, and means whereby the displacement of said member in opposition to said spring, renders said shaft rotatable in a reverse direction.

4. In a device of the character described, a shaft or spindle, a member mounted thereon provided with a socket and two series of surfaces formed therein, a laterally moving pawl carried by said shaft, a spring normally holding one of said series of surfaces in engagement with said pawl whereby said shaft is rendered rotatable in one direction and means whereby the displacement of said member in opposition to said spring places the other series of surfaces in engagement with said pawl whereby said shaft is rendered rotatable in the reverse direction.

5. In a device of the character described, a slotted shaft or spindle, a pawl carried thereby, a member slidably mounted on said shaft provided with a socket and two series of oppositely facing surfaces formed therein, means normally holding one of said series of surfaces in engagement with said pawl whereby said shaft is rendered rotatable in one direction, and means whereby the sliding of said member from its normal position on said shaft places the other series of surfaces in engagement with said pawl whereby said shaft is rendered rotatable in the reverse direction.

6. In a device of the character described, a slotted shaft or spindle, a pawl carried thereby, a handle slidably mounted on said shaft provided with a socket and two series of oppositely facing ratchet teeth formed therein, means for normally holding one of said series of ratchet teeth in engagement with said pawl, whereby said shaft is rendered rotatable in one direction and means whereby the displacement of said handle from its normal position on said shaft places the other series of ratchet teeth in engagement with said pawl, whereby said shaft is rendered rotatable in the reverse direction.

7. In a device of the character described, a slotted shaft or spindle a pawl carried thereby, a handle slidably mounted on said shaft and provided with a socket and two series of oppositely facing ratchet teeth formed therein, a spring holding one series of ratchet teeth in engagement with said pawl, whereby the shaft is rendered rotatable in one direction, and means whereby the displacement of said handle relative to said shaft renders said shaft rotatable in the reverse direction.

8. In a device of the character described, a slotted shaft or spindle, a pawl carried thereby, a handle slidably mounted thereon provided with a socket and two series of oppositely facing ratchet teeth formed therein, a spring for holding one series of ratchet teeth in engagement with said pawl, whereby the shaft is rendered rotatable in one direction, means for varying the tension of said spring, and means whereby the displacement of said handle relative to said shaft brings the other series of ratchet teeth in engagement with said pawl whereby said shaft is rendered rotatable in the reverse direction.

9. In a device of the character described, a slotted shaft or spindle, a pawl carried thereby, a handle slidably mounted thereon provided with a socket and two series of oppositely facing ratchet teeth formed therein, a spring for placing one series of ratchet teeth in engagement with said pawl, whereby the shaft is rendered rotatable in one direction, and means whereby the displacement of the handle from its normal position on said shaft, against the tension of said spring brings the other series of ratchet teeth in engagement with said pawl whereby said shaft is rendered rotatable in the reverse direction.

10. In a device of the character described, a slotted shaft or spindle, a pawl carried thereby, a handle slidably mounted thereon provided with a socket and two series of oppositely facing ratchet teeth formed therein, a spring for holding one series of ratchet teeth in engagement with said pawl, whereby the shaft is rendered rotatable in one direction, means whereby the displacement of said handle from its normal position on said shaft against the tension of said spring brings the other series of ratchet teeth in engagement with said pawl, whereby said shaft is rendered rotatable in the reverse direction, and means for limiting the expansion and compression of said spring.

11. In a device of the character described, a slotted shaft or spindle, a pawl carried thereby, a handle slidably mounted thereon, provided with a socket and two series of oppositely facing ratchet teeth formed therein, a collar on said shaft, a spring between said collar and said handle adapted to bear against said handle to normally bring one series of ratchet teeth in engagement with said pawl and means whereby the displacement of the handle from its normal position on said shaft brings the other series of ratchet teeth in engagement with said pawl.

12. In a device of the character described, a slotted shaft or spindle, a pawl carried thereby, a handle slidably mounted thereon, provided with a socket and two parallel series of oppositely facing ratchet teeth formed therein, a collar adjustably secured on said shaft, a spring around said shaft between said collar and said handle adapted to bear against said handle to normally bring one series of ratchet teeth in engagement with said pawl whereby said shaft is rendered rotatable in one direction, plates secured to the end faces of said handle and confining said pawl within the socket, and means whereby the displacement of said handle against the tension of said spring brings the oppositely facing series of ratchet teeth in engagement with said pawl, whereby said shaft is rendered rotatable in the reverse direction.

Signed by me at Harrisburg Pa. this 24″ day of January 1908.

WILLIAM H. KEPPLE.

Witnesses:
A. M. Landis,
H. E. Bender.